United States Patent Office 3,796,608
Patented Mar. 12, 1974

3,796,608
SURFACE TREATMENT
Martin B. Pearlman, New York, N.Y.
(78—05 141st St., Flushing, N.Y. 11367)
No Drawing. Continuation-in-part of application Ser. No. 630,187, Apr. 12, 1967, now Patent No. 3,578,508. This application May 10, 1971, Ser. No. 141,929
Int. Cl. B23b 15/04
U.S. Cl. 148—6.14
6 Claims

ABSTRACT OF THE DISCLOSURE

Treatment of metals, and other surfaces, with dilute colloidal slightly acidic dispersion of silica. The metals become resistant to chemical attack.

---

This application is a continuation-in-part of my application Ser. No. 630,187, filed Apr. 12, 1967, now Pat. No. 3,578,508, whose entire disclosure is incorporated by reference.

In accordance with one aspect of this invention metals are made resistant to corrosion and to chemical attack by depositing an adsorbed layer of silica thereon. This may be accomplished by treating their surfaces with a dilute slightly acidic colloidal aqueous dispersion of silica. Various techniques for making colloidal aqueous dispersions of silica are well known in the art. It is convenient to employ dispersions made by simply treating finely divided silica (e.g. ground quartz) with water. The dispersion is preferably quite dilute. Desirably it should not be so concentrated as to yield, on contact with the metal, a deposit distinctly visible to the naked eye.

The metal treatment process of this invention has resulted in the production of metallic surfaces which are bright and uncolored and which seem to the naked eye to be uncoated. Evidently the deposited material on the metal constitutes at most a very thin and transparent layer much thinner than 0.001 inch. Hydrophobic surfaces which "shed" water and dilute sulfuric acid have been produced; this is surprising in view of the known hydrophilic nature of silica and it may be due to some combination with organic material, such as organic hydroxyl compounds (e.g. alcohols such as polyhydric alcohols) that may be present on the surface of the metal or in the cleaning aids described below; this combination may be a physical codeposition on the surface or a chemical combination such as an esterification of hydroxyl groups attached to silicon atoms.

The metal treated may, for instance, be any of the usual metals conventionally used for constructing and fabricating articles to be exposed to the atmosphere. I have thus far treated ferrous metal (e.g. steel), zinc, aluminum, copper and silver, all with successful results. The striking efficacy of the process is illustrated by the fact that it makes zinc resistant to dilute sulfuric acid.

The treated surface may be painted or otherwise coated in conventional manner, e.g. painted with the usual oil-based paints such as drying oil-modified alkyd resin paints, or electroplated with, say, brass, cadmium or chromium.

The metal treatment may also be applied to metals carrying coatings, such as paint or metal plating (e.g. chrome-plating) thereon to further protect the metal, e.g. by depositing the silica or silica-containing material at any of the exposed areas of base metal, such as at pinholes in the coating.

As indicated above, the treating liquid is preferably slightly acidic; generally its pH is above 5 and more usually above 6.

The silica dispersion is preferably applied to a clean metal surface. In one particularly preferred form of the invention, the silica dispersion is mixed with an aqueous cleaning solution. Particularly suitable is a dilute solution made from or containing molasses; for instance, a solution containing the glucose and fructose of blackstrap molasses, preferably together with a surfactant (emulsifying or wetting agent), may be used.

The period of treatment of the metal may be very short. For practical purposes periods of less than an hour (e.g. a few minutes or less) are preferred. The metal need merely be dipped in a bath of the treating solution, then removed from the bath and rinsed (as with water) and dried. The temperature of treatment is conveniently from, say, room temperature to the atmospheric boiling point of the treating solution, but it is within the broader scope of the invention to effect treatment at higher temperatures such as may be obtained under superatmospheric pressures. Temperatures so high as to effect alloying and penetration of surface material into the body of the metal (as in commercial siliconizing) are not needed in my process.

The following examples are given to illustrate this invention further. In the examples as in the rest of the application, all proportions are by weight unless otherwise indicated. In the examples, the pressure is atmospheric unless otherwise indicated.

EXAMPLE 1

A colloidal dispersion of silica in water is made by treating finely divided highly pure silica flour (of a fineness to pass a 325 mesh U.S. Standard screen) with hot water, in this case water near its boiling point. This can be done on a small scale by percolating the hot water through a bed of the silica flour. In one experiment an ordinary clean 12 cup household coffee percolator is used (the percolator is made of Pyrex glass, except for the perforated basket which is of aluminum and, for this experiment, is partially covered with filter paper to assist in retaining the silica in the basket. Into the percolator are placed 16 fluid ounces of water and (in the filter paper-lined basket) 25 grams of the silica flour. The percolator is heated to cause the water to boil and to be repeatedly driven up over and through the bed of silica flour; this is continued for about 40 minutes. The water becomes turbid (cloudy) and distinctly acidic (pH of 6.03).

The silica flour used above has the following analysis: 99.61% $SiO_2$, 0.05% ferric oxide, 0.19% alumina, 0.04% titania.

EXAMPLE 2

A particularly suitable cleaning solution for cleaning of metal surfaces during the corrosion-proofing treatment is made by dissolving 2 fluid ounces of blackstrap molasses in a quart of water at about 120° F., adding ¼ fluid ounce of methanol and allowing the mixture to stand, e.g., without heating or cooling, in a room at 75° F. for about 5 days. During this period a precipitate, believed to be largely sucrose, is formed, owing in part at least to the effect of the methanol; also the mixture becomes quite odorous probably due to fermentation. The mixture is filtered (through filter paper) and 10 cc. of 40% formol is added thereto as a preservative. The resulting dark red brown mixture may be diluted with water considerably (e.g. a hundredfold) and used to clean metal in conjunction with the silica treatment.

EXAMPLE 3

In a particularly preferred form of the invention the cleaning and treatment are effected simultaneously. To a liter of hot water (at about 120° F.) there are added 10 cc. of the cloudy liquid of Example 1 and 10 cc. of the liquid of Example 2. A piece of rolled mild steel, carrying an oily mill finish is then treated with this mixture by immersing the steel therein and leaving it there for a short period (e.g. about 1 to 10 minutes, for instance 2 minutes) at room temperature. The steel surface is then rinsed immediately with water and dried. To the naked eye the steel surface appears bright like clean steel but otherwise unchanged by this treatment. However, it is now highly resistant to atmospheric corrosion, highly resistant to attack by dilute sulfuric acid (e.g. it may be immersed for days or weeks in aqueous sulfuric acid of, say, 5 to 35% concentration without evidence of significant attack). It is also tested in 3 M HCl solution and is found to resist attack by that solution. The corrosion resistant surface resists abrasion.

EXAMPLE 4

Example 3 is repeated except that the metal is aluminum. The metal appears unchanged to the naked eye but becomes resistant to attack by sulfuric acid, aqueous 4% NaOH solution and aqueous 4% $Na_2CO_3$ solution.

EXAMPLE 5

Example 3 is repeated except that the metal is a zinc sheet which has been rolled, using oil as the rolling lubricant. The metal appears bright like clean zinc but otherwise unchanged to the naked eye but becomes resistant to attack by sulfuric acid, aqueous 3 M HCl, aqueous 4% NaOH solution and aqueous 4% $Na_2CO_3$ solution.

EXAMPLE 6

Example 3 is repeated except that the metal is copper. The treated metal is resistant to attack by sulfuric acid, aqueous 4% NaOH solution and aqueous 4% $Na_2CO_3$ solution.

EXAMPLE 7

A silver-plated table fork (which has been cleaned with silver polish and washed with soapy water and then rinsed with water and dried) is immersed for about 3 minutes in a mixture of 100 parts of water and one part of the cloudy acidic liquid produced in Example 1, then rinsed with water and dried. The resulting treated metal retains its silver appearance, is resistant to chemical attack, showing a very greatly reduced tendency to darken and tarnish on contact with sulfides, e.g. in use in contact with eggs or on standing, otherwise unprotected, in the atmosphere.

EXAMPLE 8

Example 1 is repeated using diatomaceous silica (Johns Manville Super-Cel Hyflo) in place of the silica flour. Similar results are obtained and the resulting liquid has similar effects on metals.

EXAMPLE 9

Example 1 is repeated but the silica flour is (a) mixed with the whole mass of water, in a pot, which is then heated to the boil and maintained at the boil for ½ hour, or (b) placed on a filter paper in a plastic funnel and leached with the same amount of water (about 30 parts of water per part of silica flour) using water at about room temperature; (the liquid passing through the filter is poured over the silica flour again, repeatedly, and this operation is continued for about 45 minutes); or (c) mixed with the whole mass of tap water (in a ratio of 35 parts of water per part of silica) in a pot, and allowed to stand for 24 hours, at room temperature and then filtered through filter paper. In each case a white cloudy acidic liquid is obtained, the pH values being (a) 6.35 (b) 6.26 and (c) 6.61, each liquid having very good metal protecting properties when used as in the foregoing examples, although the liquid (c) is not as effective in the treatment.

EXAMPLE 10

50 grams of finely divided silica (crushed quartz) of size such that substantially all of it passes through a 200 mesh sieve is mixed with about 40 ounces of water and the mixture is heated at the boil in air for about 30 minutes (during which about 12 ounces of water evaporates) then cooled and filtered through filter paper. Sufficient tap water is then added to make the the volume one quart and the cloudy mixture is stirred in a glass bottle. When tested after about a month of storage, at room temperature, its pH is 6.56 and it is found to contain about 0.04 weight percent of silica.

EXAMPLE 11

Another suitable cleaning agent is made by mixing 2 fluid ounces of blackstrap molasses and 1 quart of warm water. 3 cc. of 40% formol is added, followed by ¼–¾ fluid ounce of a saponin solution (made by bringing to a boil 5 grams of soap bark in one quart of water and cooling). The product is a distinctly acidic liquid.

EXAMPLE 12

¼ fluid ounce of the silica-containing liquid made in Example 10 is mixed with the whole product of Example 11, the mixture is filtered through filter paper (No. 5 Whatman) and diluted with water to raise its pH to about 6.5.

Steel is treated with the resulting mixture, as in Example 3, with similar results.

EXAMPLE 13

In this example there is used commercial rolled sheet zinc still carrying the polymeric coating used as a lubricant for rolling. Three strips from the same sheet are used. (a) One strip is directly placed into dilute sulfuric acid; gas is evolved and the strip disintegrates in a short time. (b) The second strip is placed in a bath of a liquid formed by diluting the red brown mixture of Example 2 about a thousandfold with water, then rinsed with tap water and placed in another sample of the same dilute sulfuric acid; here, too, gas is evolved and the strip disintegrates in a short time. (c) The third strip is placed for 2½ minutes into a bath of a liquid formed by diluting the silica-containing liquid of Example 10 about fiftyfold with water, then rinsed with water and placed in another sample of the same dilute sulfuric acid; there is substantially no attack on the metal or evolution of gas, but the surface of the metal turns black (which may be due to an interaction between the sulfuric acid and the polymeric coating).

EXAMPLE 14

Example 11 is repeated, substituting beet sugar molasses (Steffens molasses) for the blackstrap molasses.

Instead of using tap water, or distilled water, for forming the silica dispersion, it is within the broader scope of this invention to use the dilute aqueous solutions (e.g. of gallic acid and the other acids or derivatives thereof) that are used (for contact with ores) in said Pat. No. 3,578,508; that is, said solutions are used, in place of the tap water, to contact the silica.

It is also within the broader scope of this invention to use, in place of the pure silica, a siliceous mineral containing metal compounds, to form a colloidal silica dispersion similarly containing dispersed or dissolved metal compounds. In this case, as in the application Ser. No. 630,187 the metal treated with the aqueous dispersion tends to turn color, generally assuming the characteristic color of the dispersed or dissolved metal compound.

With respect to the treated metal disclosed in said Pat. No. 3,578,508 it has also been found that it lends itself very well to electroplating. In one series of tests, samples thereof were cleaned in an acidic cleaning bath, of the type conventionally used prior to electroplating, and then electroplated under commerical conditions with brass, cadmium and chromium; in each case the plated sample was found to be unusually resistant to corrosion.

In the examples given herein, all pH measurements are made with a glass combination electrode and a Beckmann pH meter; when filtering is mentioned it is carried out with Whatman No. 5 filter paper; all sieve sizes are U.S. Standard; and all water is New York City tap water whose analysis, as supplied by the New York City Department of Water Resources, is given in the following table. Blackstrap molasses, mentioned in the examples, is a well known article of commerce typically containing about 30% sucrose, about 20% reducing sugars and about 20% ash, together with water.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

TABLE

| | Range | Average |
|---|---|---|
| Temperature, ° F | 33–66 | 52 |
| Turbidity (μ) | 0–8 | 3 |
| Color (mg./l.) | 1–16 | 6 |
| Taste and odor | O, Cc, M | 0 |
| Nitrogen (mg./l.): | | |
| Free ammonia | .012–.084 | .029 |
| Total albuminoid | .04–.15 | .10 |
| Nitrite | .000–.006 | .002 |
| Nitrate | .05–.20 | .13 |
| Oxygen consumed (mg./l.) | 0.9–2.5 | 1.8 |
| Carbon dioxide (mg./l.) | 1.4–3.6 | 2.5 |
| Dissolved oxygen (mg./l.) | 10.0–18.4 | 14.8 |
| pH (hydrogen ion conc.) | 6.6–7.2 | 6.9 |
| Bacteria/ml | 0–4 | 2 |
| Coliform, percent frequency, portions /5+ | | 0.50 |
| Coliforms, percent samples, 3/5 or more + | | 0.40 |
| Total organisms (su./ml.) | 35–920 | 220 |
| Amorphous matter (su./ml.) | 275–1,150 | 580 |
| Total solids (mg./l.) | 38–64 | 50 |
| Fixed solids (mg./l.) | 21–45 | 36 |
| Spec. cond. (MMhos) | 60–71 | 65 |
| LAS (mg./l.) | .00–.01 | .01 |
| Radiological levels: | | |
| Alpha, p.o./l | .00–.24 | .08 |
| Beta, p.o./l | .00–11.3 | 3.1 |
| Chloride (mg./l.) | 4.6–5.6 | 5.3 |
| Alkalinity as CaCO₃ (mg./l.) | 5–13 | 8 |
| Hardness as CaCO₃ (mg./l.) | 17–23 | 19 |
| Ca as CaCO₃ (mg./l.) | 12–16 | 14 |
| Mg as CaCO₃ (mg./l.) | 4–7 | 5 |
| Calcium as Ca | 4.8–6.4 | 5.6 |
| Magnesium as Mg | .96–1.7 | 1.4 |
| Carbonate (mg./l.) | .00 | .00 |
| Cyanide (mg./l.) | .000–.007 | .002 |
| Fluoride (mg./l.) | .05–1.25 | .87 |
| Iodide (mg./l.) | .000–.005 | .001 |
| Phosphate (mg./l.) | .05–.22 | .13 |
| Silica as SiO₂ (mg./l.) | 1.0–3.0 | 2.6 |
| Sulfate (mg./l.) | 9.5–13.5 | 11.8 |
| Aluminum (mg./l.) | .00–.05 | .02 |
| Arsenic (mg./l.) | .000–.001 | .001 |
| Barium (mg./l.) | .04–.06 | .05 |
| Boron (mg./l.) | .00–.04 | .01 |
| Cadmium (mg./l.) | .00–.00 | .00 |
| Chromium +6 (mg./l.) | .00–.00 | .00 |
| Copper (mg./l.) | .02–.08 | .05 |
| Iron (mg./l.) | .03–.25 | .06 |
| Manganese (mg./l.) | .01–.10 | .03 |
| Mercury (mg./l.) | .00–.00 | .00 |
| Potassium (mg./l.) | 0.5–1.00 | .62 |

TABLE—Continued

| | Range | Average |
|---|---|---|
| Phenol (mg./l.) | .000–.007 | .002 |
| Lead (mg./l.) | .00–.00 | .00 |
| Sodium (mg./l.) | 2.8–5.4 | 3.4 |
| Selenium (mg./l.) | .001–.003 | .002 |
| Silver (mg./l.) | .00–.00 | .00 |
| Strontium (mg./l.) | .02–.06 | .04 |
| Zinc (mg./l.) | .01–.06 | .03 |

What is claimed is:

1. Process for treating metal surfaces to improve their resistance to chemical attack which comprises bringing said surfaces into contact with an aqueous acidic composition consisting essentially of a colloidal dispersion of silica, a water-soluble sugar and a surfactant, and removing said metal surface from contact with said composition before any deposit of silica visible to the naked eye is formed on said surface, and metal being ferrous metal, zinc, aluminum, copper or silver.

2. Process as in claim 1 in which said silica is dispersed by contacting finely divided silica of less than 200 mesh particle size with water.

3. Process as in claim 1 in which the period of said contact is less than one hour and the concentration of silica in said composition is up to about 0.4 weight percent.

4. Process as in claim 1 in which said sugar is molasses.

5. Process as in claim 4 in which said surfactant is saponin.

6. Product of the process of claim 1.

References Cited
UNITED STATES PATENTS

| 3,013,897 | 12/1961 | Cupery et al. | 117—135.1 |
|---|---|---|---|
| 3,133,829 | 5/1964 | Cupery et al. | 117—135.1 |
| 3,320,082 | 5/1967 | McMahon et al. | 117—135.1 |
| 2,787,967 | 4/1957 | Nohejl | 117—135.1 |
| 3,506,499 | 4/1970 | Okada et al. | 117—135.1 |
| 1,948,029 | 2/1934 | Fisher | 252—396 |
| 2,978,349 | 4/1961 | Walsh et al. | 106—287 S |
| 3,108,970 | 10/1963 | Luvisi | 252—309 |
| 3,249,547 | 5/1966 | Fisher | 252—396 |

OTHER REFERENCES

V. E. Skipalev. Extraction of Sugar From Feed Molasses. In Chemical Abstracts. 55(7):6896h, Apr. 3, 1961.

CAMERON K. WEIFFENBACH, Primary Examiner

U.S. Cl. X.R.

117—135.1, 165; 106—14; 252—388, 396